United States Patent
Verseux et al.

(10) Patent No.: US 10,330,221 B2
(45) Date of Patent: Jun. 25, 2019

(54) PIPING SYSTEM WITH LEAK DETECTION

(71) Applicant: Airbus Operations (S.A.S.), Toulouse (FR)

(72) Inventors: Olivier Verseux, Tournefeuille (FR); David Blain, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 105 days.

(21) Appl. No.: 15/692,755

(22) Filed: Aug. 31, 2017

(65) Prior Publication Data
US 2018/0066773 A1 Mar. 8, 2018

(30) Foreign Application Priority Data
Sep. 5, 2016 (FR) ...................... 16 58225

(51) Int. Cl.
| | |
|---|---|
| F16L 55/00 | (2006.01) |
| F16L 9/18 | (2006.01) |
| F16L 9/19 | (2006.01) |
| B33Y 80/00 | (2015.01) |
| G01M 3/00 | (2006.01) |
| F16L 59/06 | (2006.01) |
| G01M 3/04 | (2006.01) |
| F16L 59/075 | (2006.01) |

(52) U.S. Cl.
CPC ................ F16L 9/19 (2013.01); B33Y 80/00 (2014.12); F16L 9/18 (2013.01); F16L 59/06 (2013.01);
(Continued)

(58) Field of Classification Search
CPC .......... F16L 9/19; F16L 9/18; F16L 2201/30; G01M 3/04; G01M 3/002
(Continued)

(56) References Cited

U.S. PATENT DOCUMENTS 3,882,382 A * 5/1975 Johnson .................. G01M 3/18
 138/104
4,160,948 A * 7/1979 Tytgat .................... G01N 17/02
 324/663
(Continued)

FOREIGN PATENT DOCUMENTS

| EP | 0949444 A2 | 10/1999 |
| JP | H10205659 A | 8/1998 |
| WO | WO 97/38258 A1 | 10/1997 |
| WO | WO 2016/111840 A1 | 7/2016 |

OTHER PUBLICATIONS

French Search Report for French Application No. 1658225 dated Apr. 25, 2017.

*Primary Examiner* — Patrick F Brinson
(74) *Attorney, Agent, or Firm* — Jenkins, Wilson, Taylor & Hunt, P.A.

(57) ABSTRACT

A piping system includes a first and a second inner tube assembled end to end and a hot fluid detector. For each inner tube, a first peripheral tube into which the inner tube is introduced and fixed. For each first peripheral tube, a second peripheral tube into which the first peripheral tube is introduced and fixed. A sleeve has a first section which surrounds the ends of the second two peripheral tubes facing one another and a second section which extends between the two ends up to the walls of the first two peripheral tubes. A pipe crosses the sleeve and opening out, on the one hand, into the space between the inner tubes and the first peripheral tubes and, on the other hand, in the vicinity of the hot fluid detector. A piping system of this kind is therefore thermally insulated and allows detection in the event of a leak.

4 Claims, 1 Drawing Sheet

(52) U.S. Cl.
CPC .............. *G01M 3/002* (2013.01); *G01M 3/04* (2013.01); *F16L 59/075* (2013.01); *F16L 2201/30* (2013.01)

(58) Field of Classification Search
USPC ....... 138/114, 104; 73/40.5 R, 40; 285/123.1
See application file for complete search history.

(56) References Cited

U.S. PATENT DOCUMENTS

| | | | | |
|---|---|---|---|---|
| 4,468,609 | A * | 8/1984 | Schmitz | G01M 3/18 324/667 |
| 6,032,699 | A * | 3/2000 | Cochran | B67D 7/3209 138/104 |
| 6,305,407 | B1 * | 10/2001 | Selby | F16L 35/00 137/312 |
| 6,848,464 | B2 * | 2/2005 | Ransom | F16K 24/04 137/238 |
| 7,857,553 | B2 * | 12/2010 | Tsuchie | F16L 9/18 406/193 |
| 9,389,137 | B2 * | 7/2016 | Millet | G01M 3/045 |
| 2003/0140977 | A1 * | 7/2003 | Berton | C23F 13/20 138/104 |
| 2013/0014840 | A1 | 1/2013 | Millet et al. | |

* cited by examiner

PIPING SYSTEM WITH LEAK DETECTION

CROSS-REFERENCE TO RELATED APPLICATION

This patent application claims priority to French patent application FR 16 58225, filed on Sep. 5, 2016, the entire disclosure of which is incorporated by reference herein.

TECHNICAL FIELD

The disclosure herein relates to a piping system for detecting a leak.

BACKGROUND

In certain environments, it is necessary to prevent a leak from a piping system carrying a hot pressurized fluid, such as air, particularly when the piping system is in the vicinity of a highly flammable fluid such as in an aircraft engine, for example.

Moreover, in an environment of this kind, it is desirable for the temperature of the piping system to be lowered in order to avoid any risk of a fire starting.

It is currently known in the art for the piping system carrying hot air to be wrapped in a rock wool-type heat insulating material.

In order to detect a possible leak from the piping system, it is known in the art for vents to be installed along thermal insulation and for hot air detectors to be positioned in the vicinity of these vents. Hence, when there is a leak, the hot air spreads in thermal insulation and leaves through the vents where it can be picked up by the detectors.

To the extent that thermal insulation slows down the hot air, it is necessary for vents to be installed at regular distances relatively close to one another.

Moreover, detectors of this kind are traditionally fragile wires which are formed along the piping system with the help of regularly spaced supports while observing minimum curvatures. An installation of this kind is therefore performed manually and is relatively time-consuming.

SUMMARY

An object of the present disclosure is that of disclosing a piping system for detecting a leak and which is thermally insulated.

To this end, a piping system is proposed which comprises:
a first inner tube and a second inner tube assembled end to end,
a hot fluid detector,
for each inner tube, a first peripheral tube into which the inner tube is introduced and fixed, the ends of the first two peripheral tubes being spaced apart one from the other,
for each first peripheral tube, a second peripheral tube into which the first peripheral tube is introduced and fixed, the ends of the second two peripheral tubes being spaced apart one from the other, and
a sleeve exhibiting a first section which surrounds the ends of the second two peripheral tubes facing one another and a second section on the inside of the first section which extends between the two ends up to the walls of the first two peripheral tubes, and a pipe crossing the sleeve and opening out, on the one hand, into the space between the inner tubes and the first peripheral tubes and, on the other hand, in the vicinity of the hot fluid detector.

A piping system of this kind is therefore thermally insulated and allows good leak detection by limiting the pressure drops.

Advantageously, the sleeve is made up of two sections fixed one to the other by hinges.

Advantageously, the assembly made up of a first tube and peripheral tubes which surround the first tube is realized by 3D printing.

BRIEF DESCRIPTION OF THE DRAWINGS

Characteristics of the disclosure herein referred to above, as well as others, will become clearer on reading the following description of an exemplary embodiment, the description being made in relation to the attached drawings, in which.

DETAILED DESCRIPTION

Figure 1:
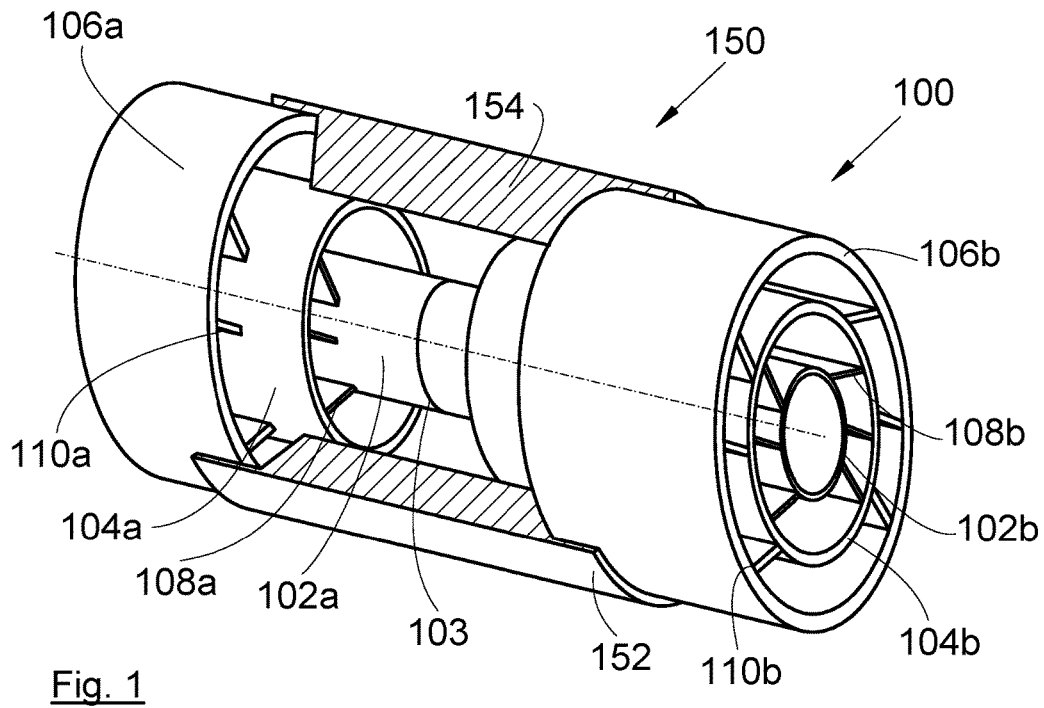
FIG. 1 is a perspective view of a piping system according to the disclosure herein and FIG. 2 is a sectional view through a radial plane of the piping system in FIG. 1.
Figure 2:
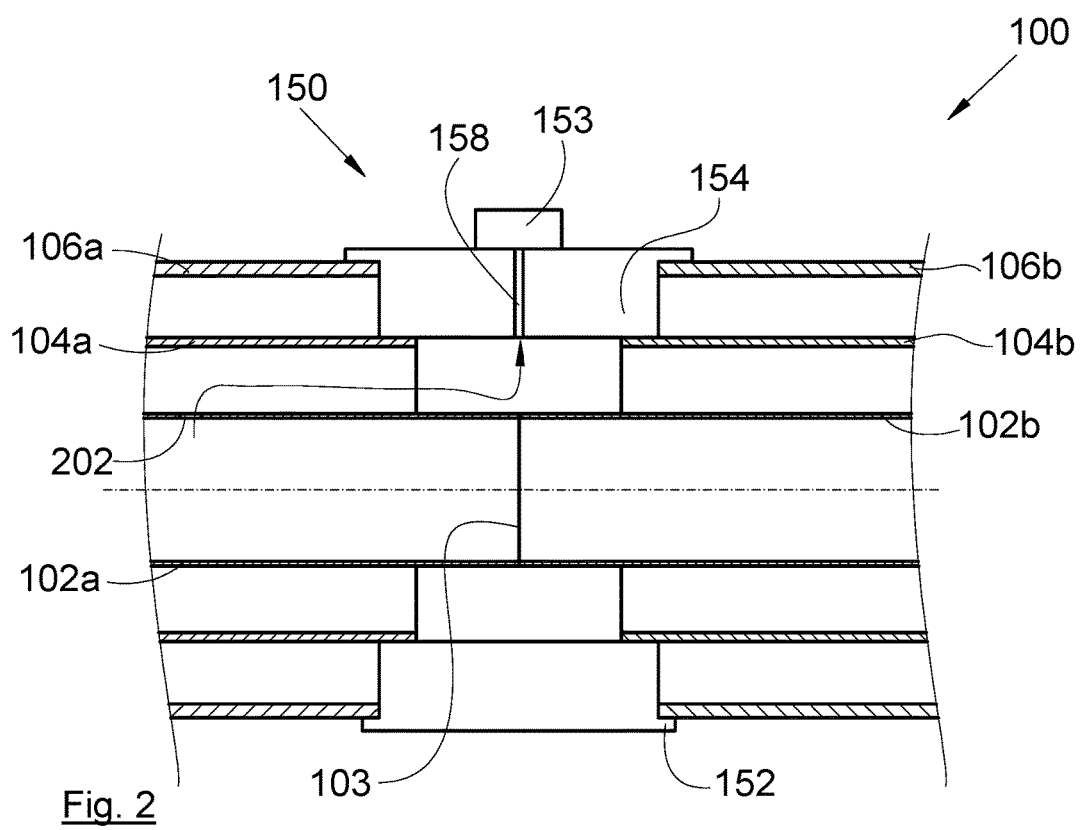

FIG. 1 and FIG. 2 show a piping system 100 which constitutes a junction area between a plurality of tubes. The piping system 100 comprises a first inner tube 102a and a second inner tube 102b. The two inner tubes 102a-b are assembled end to end, by welding for example, along a contact line 103. The inner tubes 102a-b thereby constitute a piping system which transports a hot pressurized fluid such as air.

For each inner tube 102a-b, the piping system 100 comprises a first peripheral tube 104a-b, into which is introduced the inner tube 102a-b which is fixed to the first peripheral tube 104a-b here by first spacers 108a-b which are fixed between the inner tube 102a-b and the first peripheral tube 104a-b.

The ends of the first two peripheral tubes 104a-b are remote one from the other, in order to leave the way open from the inside of the first peripheral tubes 104a-b towards the outside of the first peripheral tubes 104a-b. The contact line 103 is thereby equally accessible.

For every first peripheral tube 104a-b, the piping system 100 comprises a second peripheral tube 106a-b into which is introduced the first peripheral tube 104a-b which is fixed to the second peripheral tube 106a-b in this case by second spacers 110a-b which are fixed between the first peripheral tube 104a-b and the second peripheral tube 106a-b.

The ends of the second two peripheral tubes 106a-b are spaced apart one from the other, in order to leave the way open from the inside of the second peripheral tubes 106a-b towards the outside of the second peripheral tubes 106a-b. The contact line 103 is likewise equally accessible.

An arrangement of this kind allows thermal insulation of the inner tube 102a-b to be guaranteed due to the presence of two additional layers of air.

In the event that hot pressurized fluid should escape, this hot fluid spreads in the spaces between the inner tubes 102a-b and the first peripheral tubes 104a-b, then possibly between the first peripheral tubes 104a-b and the second peripheral tubes 106a-b. This hot fluid therefore no longer undergoes a pressure drop due to an insulating material and it is then able to spread over greater distances, which allows the number of detectors to be provided to be reduced.

In particular, it is possible to have a plurality of junction areas, one following the other, and when there is a hot fluid leak, this can spread quickly through the different tubes without encountering obstacles.

The piping system 100 likewise comprises a sleeve 150 which extends about the second peripheral tubes 106a-b, in order to guarantee the tightness seal between the inside of the piping system 100 and the outside of the second peripheral tubes 106a-b. The sleeve 150 can be seen in section in FIG. 1.

The sleeve 150 therefore exhibits a first section 152 in the form of a cylinder which surrounds the ends of the second two peripheral tubes 106a-b facing one another, and a second section 154 in the form of a crown on the inside of the first section 152 which extends between the two ends up to the walls of the first two peripheral tubes 104a-b.

As can be seen more clearly in FIG. 2, the second section 154 fills the space between the ends of the second two peripheral tubes 106a-b and the space between the second peripheral tubes 106a-b and the first peripheral tubes 104a-b.

The piping system 100 likewise exhibits a hot fluid detector 153, traditionally a temperature detector located in the vicinity of the sleeve 150.

The sleeve 150 is pierced by a pipe 158 which crosses the sleeve and opens out, on the one hand, in the space between the inner tubes 102a-b and the first peripheral tubes 104a-b and, on the other hand, in the vicinity of the hot fluid detector 153.

Hence, when there is a hot fluid leak 202 from an inner tube 102a, this hot fluid spreads rapidly in the space between the inner tubes 102a-b and the first peripheral tubes 104a-b, then through the piping 158, reaching the hot fluid detector 153.

The hot fluid detector 153 can then send a signal to a remote surveillance system, through a wired or radio connection, for example.

As explained above, it is possible to have a plurality of junction areas, one following the other. In this case, it is possible to envisage that only certain sleeves 150 exhibit a pipe 158 and a hot fluid detector 153. In effect, the other sleeves will not be pierced and will ensure tightness and the hot fluid that has leaked out will spread as far as the next pierced sleeve 150 which is equipped with a hot fluid detector 153.

Of course for improved thermal insulation, it is possible to envisage more peripheral tubes.

The sleeve 150 may, for example, by made up of two sections fixed one to the other by hinges. The positioning of the sleeve 150 then involves placing the two sections about tubes and tightening the two sections about tubes and fixing them by any appropriate means such as screws, for example.

According to one particular embodiment, each assembly made up of a first tube 102a-b and peripheral tubes 104a-b and 106a-b which surround it is realized by 3D printing to allow complex forms to be produced, in particular bends. In particular, the use of 3D printing allows assemblies to be designed which prevent the rupture of the assembly. In the embodiment of the disclosure herein shown here, the spacers 108a-b and 110a-b are realized at the same time by 3D printing. The 3D printing technology used is preferably an additive technology such as additive layer manufacturing (ALM), for example.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A piping system comprising:
   a first inner tube and a second inner tube assembled end to end;
   a hot fluid detector;
   for each of the first and second inner tubes, a first peripheral tube into which the inner tube is introduced and radially spaced, the, ends of the first two peripheral tubes being spaced apart one from each other;
   for each first peripheral tube, a second peripheral tube into which the first peripheral tube is introduced and radially spaced, the, ends of the second two peripheral tubes being spaced apart one from the other; and
   a sleeve a first section which surrounds the ends of the second two peripheral tubes facing one another and a second section on the inside of the first section which extends between the ends of the second two peripheral tubes down to the walls of the first two peripheral tubes, and a pipe extending through the sleeve and opening out at a first end into the space between the inner tubes and the first two peripheral tubes and at a second end in a vicinity of the hot fluid detector.

2. The piping system of claim 1, wherein the sleeve comprises two sections fixed one to another by hinges.

3. The piping system of claim 2, wherein the first and second inner tubes and the first and second peripheral tubes which surround the first and second inner tubes are 3D printed.

4. The piping system of claim 1, wherein the first and second inner tubes and the first and second peripheral tubes which surround the first and second inner tubes are 3D printed.

* * * * *